United States Patent [19]

Mitsuhashi

[11] Patent Number: 4,778,291
[45] Date of Patent: Oct. 18, 1988

[54] DOT MATRIX PRINTER HAVING INTERCHANGEABLE PRINT HEAD AND FONT CARTRIDGE

[75] Inventor: Shuji Mitsuhashi, Morioka, Japan
[73] Assignee: Alps Electric Co., Ltd., Japan
[21] Appl. No.: 42,173
[22] Filed: Apr. 24, 1987
[30] Foreign Application Priority Data Aug. 1, 1986 [JP] Japan .................. 61-181517

[51] Int. Cl.⁴ ............................. B41J 3/12
[52] U.S. Cl. ................... 400/121; 400/175; 400/692
[58] Field of Search ............... 400/121, 175, 124, 692, 400/61, 70, 149-151, 171

[56] References Cited

U.S. PATENT DOCUMENTS 4,388,010 6/1983 Mott .......................... 400/121 X
4,411,540 10/1983 Nozaki ........................ 400/175

FOREIGN PATENT DOCUMENTS 96870 6/1982 Japan ...................... 400/121
127361 6/1986 Japan ...................... 400/121

Primary Examiner—Paul T. Sewell
Attorney, Agent, or Firm—Guy W. Shoup; Paul J. Winters

[57] ABSTRACT

A dot printer comprising a printer head freely detachably attached to a carriage in the printer and a system cartridge also freely detachably attached to the printer, said system cartridge having stored a character front and a firmwear program therein, wherein the number of dots printed can be changed by exchanging the printer head and the system cartridge with those which are different in number of pins used. Printing can be thus done with any desired numbers of dots which meet various purposes and one dot printer can be used for various purposes with extremely high economy.

1 Claim, 2 Drawing Sheets

DOT MATRIX PRINTER HAVING INTERCHANGEABLE PRINT HEAD AND FONT CARTRIDGE

BACKGROUND OF THE INVENTION (a) Field of the Invention

The present invention relates to a dot printer which has been improved to change the number of dots printed.

(b) Prior Art

FIG. 2 is a block diagram showing an example of the electric arrangement of the dot printer. A character font 2, a firmwear program 3 and the like are stored in a system cartridge 1 and character data is read out of the character font 2 one after another, responsive to signal applied from a central processing unit 4. These character data are applied to a printer head control unit 5, which controls a head driver 6 according to these character data to appropriately drive pins of a printer head 7. Line feed and head movement control signals are read out of the firmwear program 3 and applied to line feed and head movement control circuits 8 and 9, respectively, to appropriately control line feed and head movement step motors 10 and 11. The printer head 7, the head moving step motor 11 and the line feed motor 10 are thus appropriately controlled to carry out printing.

The printer head 7 has 9, 18 or 24 pins and the character data and the like become different, depending upon the number of pins of the printer head 7. The character font 2 and the firmwear program which correspond to the number of pins of the printer head 7 are stored in the system cartridge 1.

When the number of pins of the printer head 7 is increased to increase the number of dots which form a character, complicated configurations which represent Chinese characters, for example, can be clearly drawn, but the amount of data to be stored in the character font 2 becomes large accordingly and a large storage capacity is needed, thereby making the cost high. Alphabets and figures can be sufficiently discriminated one another even when they are printed by a small number of dots, and the number of pins of the printer head 7 can be thus decreased together with the amount of data to be stored in the character font 3, thereby making the cost low.

The printer head 7 and the system cartridge 1 were incorporated in to the printer in the manufacturing process in the case of the conventional dot printers, thereby making it difficult for the user to exchange them with new ones. Therefore, these dot printers which have a large number of dots were used to print Chinese characters and the like, while those dot printers which have a small number of dots were used to print alphabets and figures. The conventional dot printer were thus used depending upon what they were used for.

SUMMARY OF THE INVENTION

The present invention is therefore intended to eliminate the above-mentioned drawbacks, and the object of the present invention is to provide a dot printer capable of changing the number of dots printed according to the purposes for which it is used.

The object of the present invention can be achieved by a dot printer comprising a printer head freely detachably attached to a carriage in the printer, and a system cartridge also freely detachably attached to the printer, said system cartridge having stored a character font and a firmwear program therein, wherein the number of dots printed can be changed by exchanging the printer head and the system cartridge with new ones which are different in the number of dots.

Since the printer head and the system cartridge are made freely detachable, they can be appropriately selected to have a desired number of dots according to the purposes for which the printer is to be used. One dot printer can be thus used as those which are different in the number of dots printed.

DETAILED DESCRIPTION OF THE PREFERRED EMBODIMENT

Figure 1:
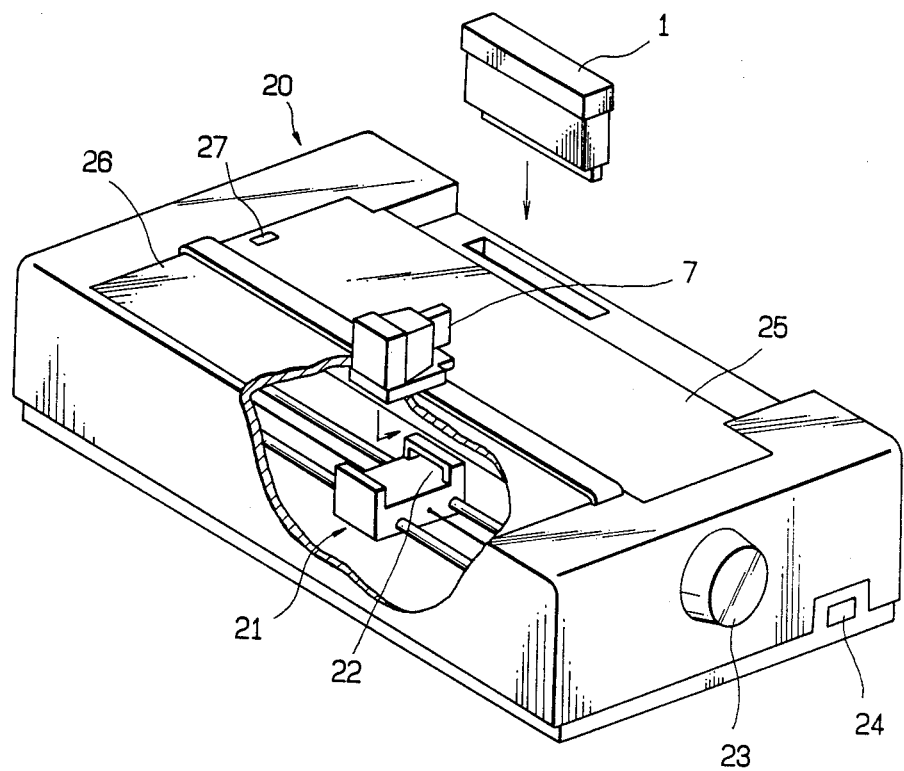
FIG. 1 is a perspective view showing an example of the dot printer according to the present invention.
Figure 2:
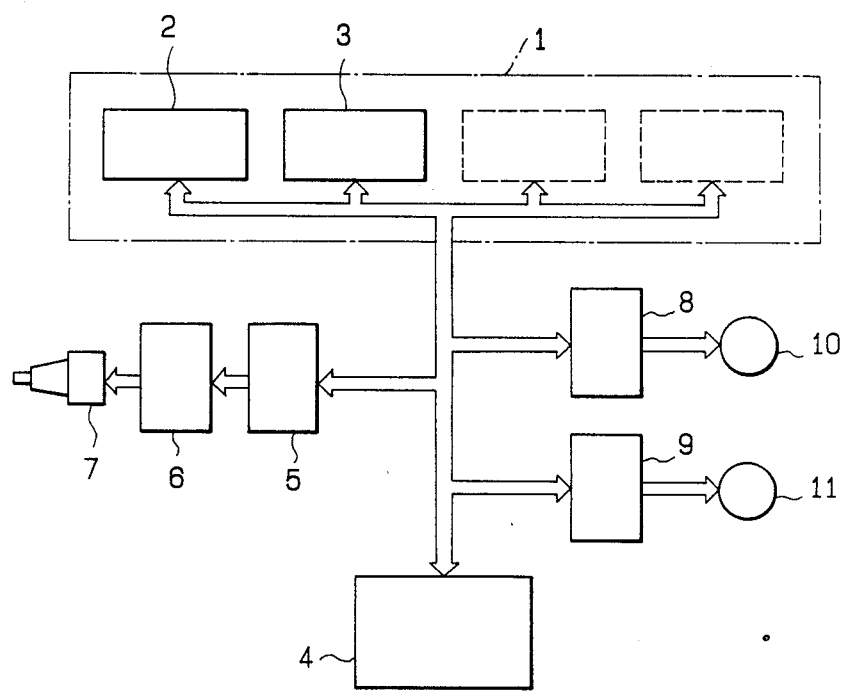
FIG. 2 is a block diagram showing an example of the electric arrangement of the dot printer.

An embodiment of the present invention will be described referring to FIG. 1, which is a perspective view showing a dot printer of the present invention partly cut away.

A system cartridge 1 in which a character font 2, a firmwear program 3 and the like are stored is freely detachably attached to the printer 20. A printer head 7 is also freely detachably attached to a carriage 21 in the printer 20. The carriage 21 is provided with a recess 22 at the front end portion thereof and when the front end portion of the printer head 7 is fitted into the recess 22 of the carriage 21, their electric connection can be completed and positioning and fixing of the printer head 7 can be achieved. The printer head 7 is freely detachably attached to the carriage 21 like this, but needless to say, the arrangement of freely detachably attaching the printer head 7 to the carriage is not limited to the above.

Plural kinds of the printer heads 7 each different in number of pins but same in shape are provided. Plural kinds of the system cartridges 1 each having stored a character font 2 and the like according to the number of pins of the printer head used are provided as well.

When the printer head 7 having a desired number of pins and the system cartridge 1 corresponding to this printer head 7 are attached to the printer 20, the dot printer can be used as having the desired number of dots which meets its usage. Therefore, one dot printer can be used for various purposes and with economy.

In FIG. 1, numeral 23 represents a platen knob, 24 a power switch, 25, 26 window covers, and 27 a friction lever.

According to the dot printer of the present invention as described above, printing can be done with any desired numbers of dots which meet various printing purposes when the printer head and the system cartridge are exchanged with different ones. One dot printer can be thus used for various purposes with extremely high economy.

I claim:

1. A dot matrix printer comprising:
   a chassis having a first means for receiving an interchangeable font cartridge and a carriage having a second means for receiving an interchangeable dot matrix print head including a plurality of dot forming elements;

an interchangeable font cartridge insertable in said first means having a first section for storing character font data for a predetermined number of dot forming elements and a second section for storing a firmware program for generating dot matrix characters for said predetermined numbr of dot forming elements according to said character font data;

an interchangeable dot matrix print head corresponding to said font cartridge insertable in said second means having a number of dot forming elements equal to the predetermined number of dot forming elements used by said firmware program of said second section of said font cartridge;

control means for printing characters in accordance with said predetermined number of dot forming elements of said print head and based upon said same predetermined number of dot forming elements provided in said first and second sections of said font cartridge; and connecting means connecting said interchangeable font cartridge, said control means, and said interchangeable dot matrix print head for allowing printing of characters by said print head using said character font data of said first section to generate characters in accordance with said firmware program of said second section and printing the characters with said predetermined number of dot forming elements, whereby said dot matrix printer is easily reconfigured for printing characters with any desired density and resolution as determined by a desired number of dot forming elements used for printing.

* * * * *

UNITED STATES PATENT AND TRADEMARK OFFICE
CERTIFICATE OF CORRECTION

PATENT NO. : 4,778,291

DATED : October 18, 1988

INVENTOR(S) : Shuji Mitsuhashi

It is certified that error appears in the above-identified patent and that said Letters Patent is hereby corrected as shown below:

In the Abstract, line 4, "front" should read --font--.

Signed and Sealed this

Seventh Day of May, 1991

Attest:

HARRY F. MANBECK, JR.

Attesting Officer

Commissioner of Patents and Trademarks